United States Patent [19]

Logan

[11] 4,400,342
[45] Aug. 23, 1983

[54] BLADDERLESS, CLAMPLESS CURING

[75] Inventor: Brian M. Logan, Akron, Ohio

[73] Assignee: The Goodyear Tire & Rubber Company, Akron, Ohio

[21] Appl. No.: 246,817

[22] Filed: Mar. 23, 1981

[51] Int. Cl.³ .............................................. B29H 5/02
[52] U.S. Cl. ................................ 264/501; 425/28 R; 425/32; 425/44
[58] Field of Search ...................... 425/29, 32, 33, 40, 425/42, 44, 28 R; 264/501, 502

[56] References Cited

U.S. PATENT DOCUMENTS

| | | | |
|---|---|---|---|
| 2,204,531 | 6/1940 | Erbguth et al. | 425/29 |
| 2,812,544 | 11/1957 | Soderquist | 425/32 |
| 2,812,546 | 11/1957 | Soderquist | 425/32 |
| 2,978,749 | 4/1961 | Del Mar | 425/32 |
| 2,997,740 | 8/1961 | Soderquist | 425/32 |
| 3,153,263 | 10/1964 | Mallory et al. | 425/32 |
| 3,942,922 | 3/1976 | Cole et al. | 425/29 X |
| 4,222,721 | 9/1980 | Godo | 425/33 |
| 4,236,883 | 12/1980 | Turk et al. | 425/32 |

*Primary Examiner*—Jan H. Silbaugh
*Attorney, Agent, or Firm*—T. P. Lewandowski

[57] ABSTRACT

A method and apparatus for curing tires in a press without a bladder or clamps including apparatus to convert bladder presses to bladderless, clampless operation.

9 Claims, 9 Drawing Figures

BLADDERLESS, CLAMPLESS CURING

The present invention is directed at curing elastomer articles in a mold type curing press without the use of a curing bladder or clamps to seal the article being molded against the press mold. It is known to cure elastomer articles, such as for example tires, in mold type curing presses wihout the use of a curing bladder to cure both retread and new tires. It is desirable in both cases to seal the inner cavity of the tire being cured to retain the curing media being used to prevent its loss and most particularly to prevent it from entering between the article being molded and the mold itself.

The problem is particularly acute for new tires which do not have cured carcasses as do retread tires. New tires are made up totally of uncured materials. Initially a bullring was used to seal off the entire opening between the bead portions of the tire thereby sealing the inner cavity of the tire to retain the curing media. The bullring was of an elastomer material which could not injure the bead portion of the tire and provided good sealing contact therewith. Subsequently it was found that the press and mold chamber, common to the tire cavity when the bullring was absent, could be sealed to form a necessary closed cavity for curing the tire. This overcame the problem of the bullring insulating the bead portion of the tire from the curing media to allow a more uniform cure. When the bullring was eliminated it was replaced with mechanical clamps to assure sealing of the bead portion of the tire against the mold. While the mechanical clamps have considerably reduced the contact area of the bead portion of the tire during curing, recent efforts at improving the clamping mechanisms indicate curing problems still exist, for example it is taught to periodically move the clamp mechanism between at least two positions on the bead portion of the tire so that the clamp mechanism does not always contact a single point on the bead portion of the tire to insulate it from the curing media.

With all the above advance in the curing art, problems still exist even in addition to the problem of sealing the bead portion to the mold to prevent passage of the curing media. Where the tire is not properly aligned within the mold upon being placed therein, the mechanical clamps can mar the soft uncured material in the area of the bead portion of the tire. Such marring not only can cause problems in the finished product but further can cause leakage through the tire inner liner of the curing media and even separation of the liner and/or plies of the tire. Further, since the mechanical clamps must be removed to permit placement of the tire in the mold they are generally segmented to permit them to expand outwardly to engage the tire bead portion. Such segmented clamps often leave undesirable ridges on the cured tire caused by the parting line between the segmented parts thereof.

The present invention overcomes the above problems by elimination of clamping means having the further advantage of eliminating their cost and reducing the number of maintenance problems. Other advantages are less initial capital cost in the mold press, more uniform bead rubber curing and more uniform bead rubber thickness.

The present invention relates to the curing of elastomer articles and more particularly to the bladderless, clampless curing of tires. It includes a press that does not use a curing bladder for curing a cylindrically to toroidally shaped article having at least two separable mold portions and an article to mold sealer of a non-mechanical contact with the article type for sealing the article against each mold portion to prevent passage of curing media between the mold and the article.

The invention may be practiced by curing a cylindrically to toroidally shaped elastomer article in a mold having upper and lower portions without the use of a curing bladder by placing the article over the lower mold portion and initiating closing of the mold. Before the mold closes a flow of low pressure media is initiated into the article and mold cavity. The article may be shaped to, or to nearly, conform to the shape of the mold using the low pressure media and the article and upper mold portion move toward contact with one another as the mold continues to close. The article is positioned over the upper mold portion using the low pressure media for initially locating the article to enable the article to seat on the upper mold portion. The article is thereby sealed against the lower and upper mold portion to form a pressure chamber of the article cavity by continuing the flow of low pressure media after contact of the article with the mold portion to further seat the article on the mold portions. The mold is then closed and curing media is provided to the article cavity in place of the low pressure media at a pressure and temperature suitable to cure the article. The process is completed by providing the remaining conventional steps to complete the cure of the article.

The invention includes the centering of the article relative to the mold and the low pressure media may be used to do this. Also, a pause in the closing of the mold may be introduced to provide additional time for shaping or sealing. A steam flush may be introduced to purge the low pressure media from the article cavity before the curing media is introduced. Further, there is provided apparatus for converting a bladder type curing press into a bladderless type press having at least two mold portions in the press cavity for shaping an elastomeric article of a cylindrical to toroidal shape, such as a tire, into its final mold shape including means for scaling the press cavity, such as a seal ring for the upper cavity seal and a seat of the removed bladder for the lower press cavity seal. Further included are means for sealing the article against each mold portion to prevent passage of curing media between mold and article.

The above invention and its advantages will become readily apparent to one skilled in the art from reading the following detailed description of embodiments of the invention when considered in light of the accompanying drawings, in which.

Figure 1:
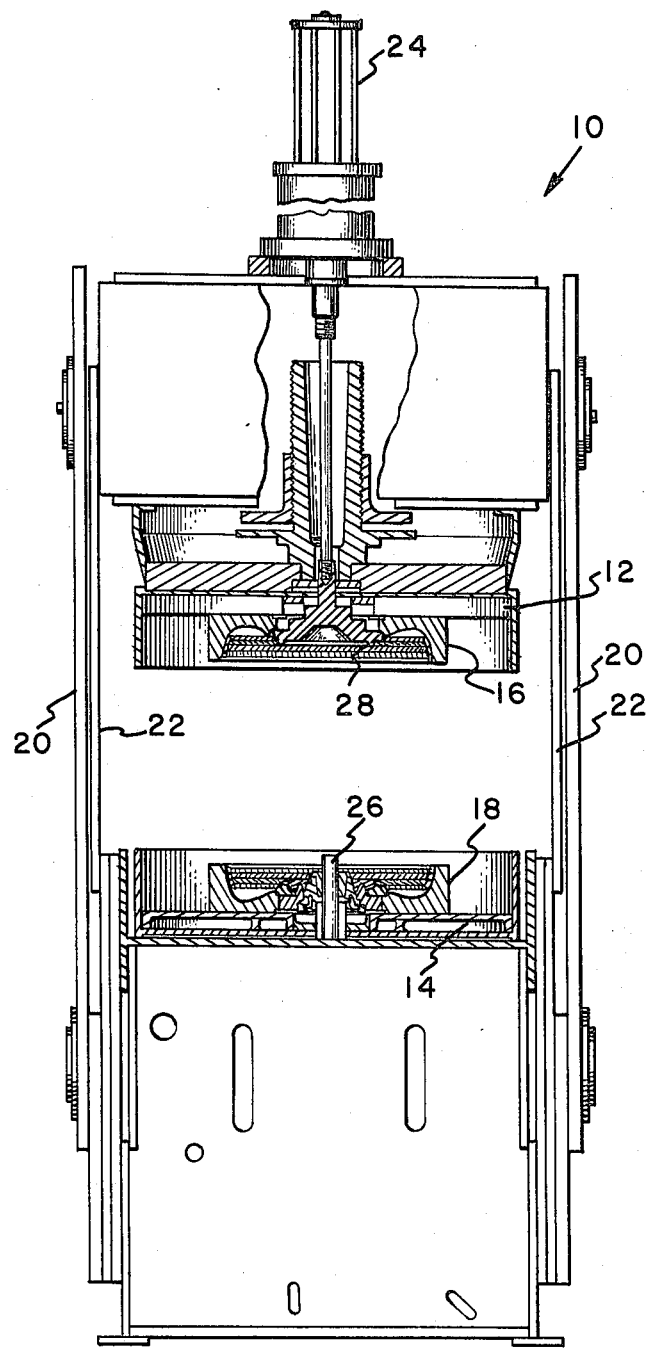
FIG. 1 is an elevational view of a press in accordance with the present invention having portions thereof broken away for purposes of better illustration.
Figure 2:
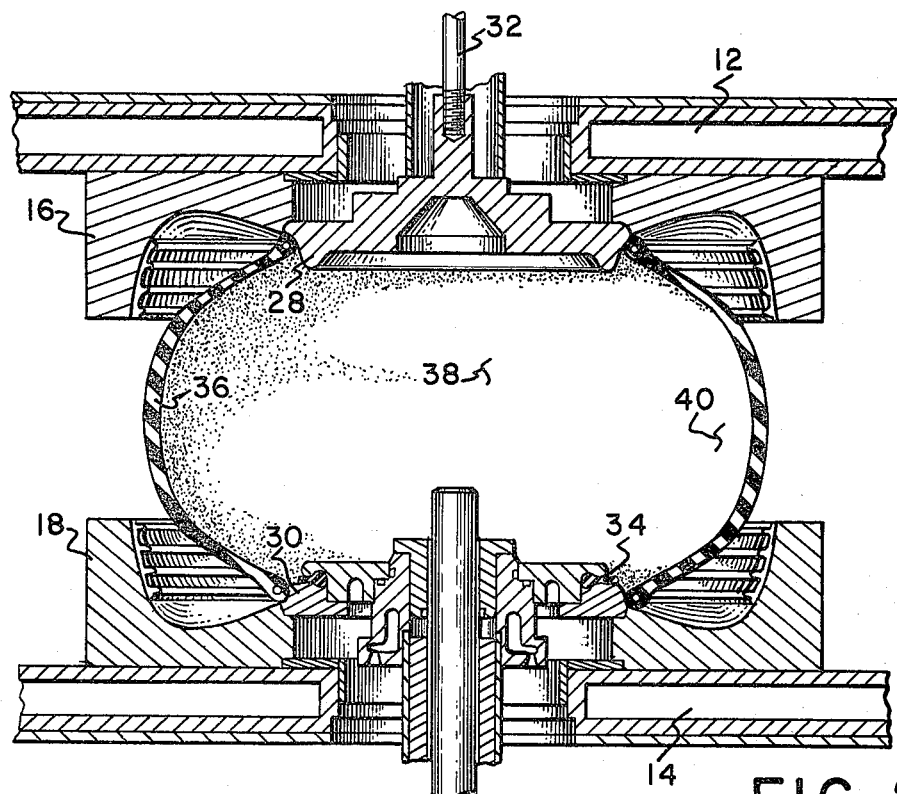
FIGS. 2 and 3 are enlargements of portions of the press illustrated in FIG. 1 illustrating different stages of operation.
Figure 3:
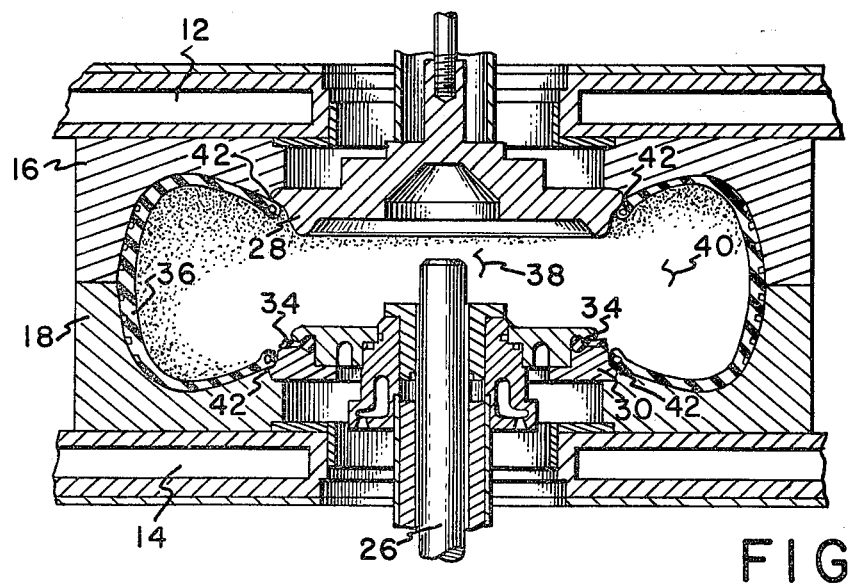

Referring to FIGS. 1 through 3, in FIG. 1 a tire press 10 is illustrated of the standing post type having a double acting center mechanism. The press 10 set-up illustrated is for curing radial tires and the press 10 is open to receive a tire. The top steam platen 12 and bottom steam platen 14 provide heat by circulation of steam or hot water there through to upper and lower mold portions 16 and 18 respectively which are attached thereto. The press 10 may be closed to thereby close the upper and lower mold portions 16 and 18 upon each other by lowering the upper portion thereof with the side link and end lever, 20 and 22 respectively, linkages on either side of the press 10. A tilt cylinger (not illustrated) in the rear of the press is operative on the above linkages to activate opening and closing of the press 10.

A top ring cylinder 24 is illustrated on top of the press and a cylinder rod 26 to a similar bottom ring cylinder is illustrated in the bottom portion of the press 10. While the cylinders 24 and 26 have other functions, for example they are operative with respect to the press center mechanism, they are also capable of actuating upper and lower mold rings 28 and 30 as best illustrated in FIGS. 2 and 3. It will be noted that the bottom mold ring 30 is annular in shape while the upper mold ring 28 is solid in the center being connected to the cylinder rod 32 of the top ring cylinder 24. The solid upper mold ring 28 eliminates the necessity for otherwise sealing off the mold ring for example, the bottom mold ring 30 requires a seal between it and a cylinder rod 26 which is provided by the seat or bead portion 34 of the bladder which bladder has been removed. Other seal members could have been used, for example an O ring, and the bladder bead portion 34 provides along with the conventional shaft seals for the cylinder rod 26 the sealing off of the chamber in the press 10 common to the cavity created when the mold portions 16 and 18 are brought together. FIGS. 2 and 3 are illustrated with an uncured tire 36 therein. In FIG. 2 the tire 35 is illustrated as having fully engaged the mold rings 28 and 30 and preshaped to move the tire 36 out towards the mold portions 16 and 18. In FIG. 3 the tire is shown in its final molded shape with the mold portions 16 and 18 in the closed position. The position of the tire 36 in FIG. 3 provides the final seal point for the press cavity 38 and tire cavity 40, at the points 42, between the mold portions 16 and 18 and their mold rings 28 and 30. The seal is accomplished without mechanical contact of the article as would occur with the use of clamps in the absence of the bladder which has been removed from the press 10 except for the bead portion 34.

Figure 4:
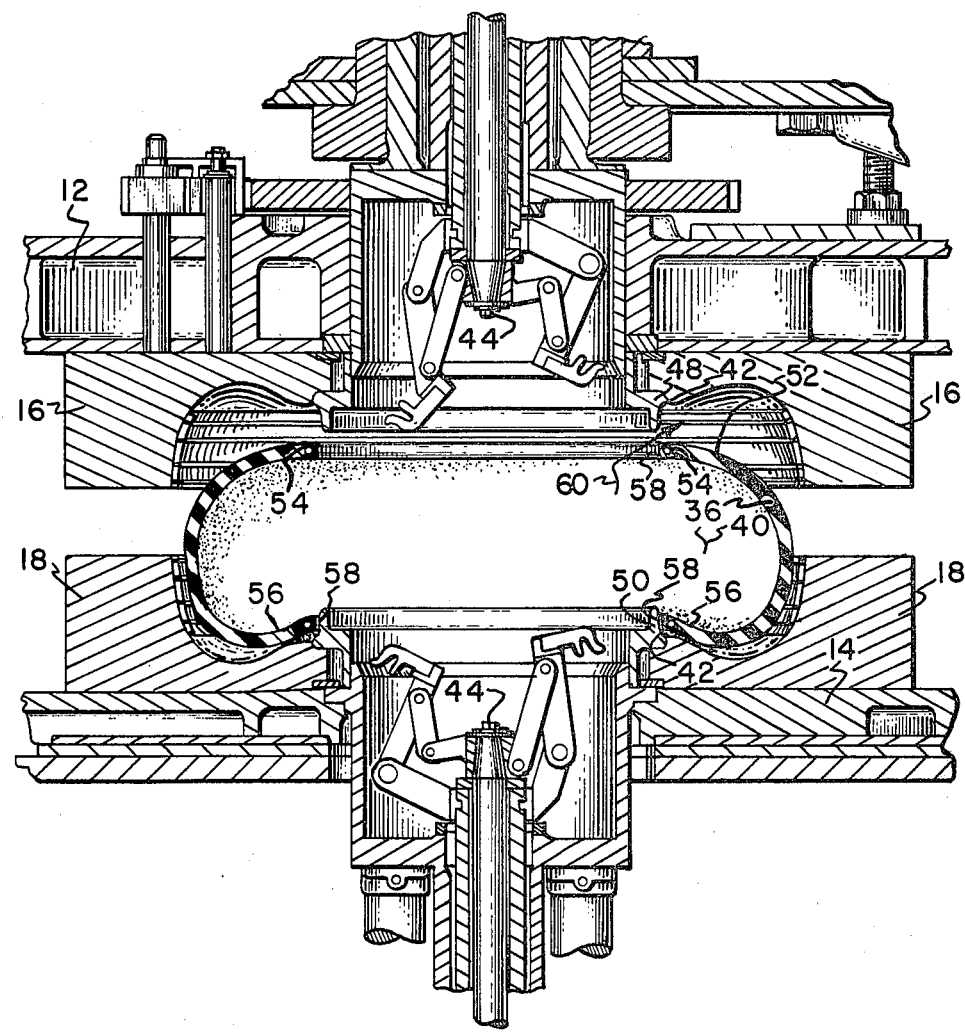
FIG. 4 is an illustration similar to FIGS. 2 and 3 of a different press also in accordance with the present invention.
Figure 5:
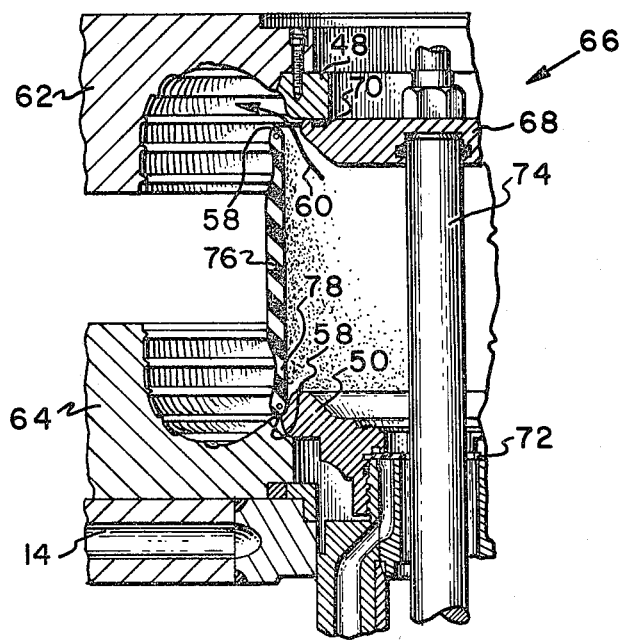
FIGS. 5 through 8 are illustrations similar to FIGS. 2 and 3 illustrating still another type of press in accordance with the present invention.

In the conventional bladderless press, for example, the converted bag-in-well press illustrated in FIG. 4, a pair of clamp assemblies 44 remain in the retracted position (as illustrated in FIG. 4) throughout the operation of curing the tire in the press in accordance with the present invention. The press in FIG. 4 is illustrated with upper and lower fixed mold rings 48 and 50 which are fixed relative to the mold portions 16 and 18 which are illustrated as closing upon the uncured tire 36. While the fixed mold rings 48 and 50 do not require a seal between themselves and the mold portions 16 and 18, the seal points 42 in this embodiment are important to prevent flow of curing fluid between the uncured tire outer surface and the mold portions 16 and 18. The tire 36 has upper and lower bead portions 54 and 56 the lower portion of which can be seen to be in contact with the lower mold ring 42 but not in a fully seated sealed position. In the sealed position bead seats 58 fully engage the mold rings 48 and 50 in the manner as illustrated in FIG. 3 for the tire 36 illustrated in that embodiment.

In FIG. 4 the press is illustrated in the position wherein the upper mold portion 16 has not engaged the upper tire bead portion 54 with its mold ring 48. At this point in time low pressure media which has previously been introduced into the press and tire cavities 38 and 40 leaves the cavities, if not exclusively nearly exclusively, in the direction indicated by the flow arrow 60 through the annulus formed between the upper mold ring 48 and the tire bead seat 58. As the mold portions 16 and 18 continue to close the annulus grows smaller increasing the velocity of the existing fluids and thereby the pressure drop across the annulus as well. The force created on the tire by the pressure drop aids in centering the tire on the upper mold ring and encourages the upper bead portion 54 of the tire 36 to position itself in its final sealing position against the mold and its ring 16 and 48, respectively. Once the bead seat 58 contacts the mold ring 48 partial sealing occurs allowing rapid build up of pressure within the partially sealed cavities of the press and tire 38 and 40 which permits the final seating of both the upper and the lower bead portions 54 and 56.

Any suitable fluid can be used for the low pressure media such as an inert gas. In the preferred embodiment air was used at a pressure as low as 2 psig. Seating pressures in the range of 14 psi were found to be successful. Air was used in the preferred embodiment having been available on the press for purposes of preshaping the tire after it had been secured with clamp assembly 44. It was found that the clamp assemblies 44 were not needed to seal the tire when the low pressure media was introduced prior to contacting the tire bead portion with the upper mold ring.

It was also found advantageous to spread the bead portions 54 and 56 on the tire 36 prior to placing the tire 36 within the press where the tire condition was such that the bead seats 58 were virtually closed upon each other or very closely located next to each other. This was done by hanging the tire 36 from one of its bead portions in the same orientation that it is placed in the press. This is particularly true for tires, such as the radial tire 36 illustrated in this embodiment, which have a tendency to distort when stored over other than short periods of time in their uncured state. Another advantage found was to use a steam flush cycle after use of the low pressure media to purge the air from the cavities 38 and 40.

It was found that at times air could be trapped within the upper portion of the tire cavity 40 and upon introduction of high pressure curing media the entrapped air would be caused to permeate the tire materials before they reached the cured state. The steam flush eliminated any air within the tire cavity 40 prior to introduction of the high pressure curing media. A steam flush of one-half minute duration at approximately 100 psig was found adequate for the above purposes.

In FIGS. 5 through 8 a standing post type press with upper and lower mold portions 62 and 64 suitable for curing bias tires is illustrated in various stages of the press operation. The press is of the single acting type having one cylinder for actuating its center mechanism assembly 66. The press has been modified by first removing the curing bladder. A top bladder ring has been converted to an upper press cavity seal such as a seal ring by the addition to the plate 68 of an O ring 70 which seats against the upper mold ring 48. With the elimination of the bladder it was also necessary to add a lower press cavity seal such as shaft seal 72 between the lower mold ring 50 and a cylinder rod 74 of the center mechanism assembly 66 which moves the top seal ring 68. Other seals could be used, for example, the solid plate type upper mold ring 28 of the press 10 in FIG. 2. In this embodiment the low pressure media used was steam and the flow of the low pressure media is again indicated by the arrow 60 in FIG. 5 whereby the annulus formed between the bead seat 58 of the uncured tire 76 is illustrated as the upper mold ring 48 closes down upon the tire 76. The flow of low pressure steam through the annulus first centers the tire bead seat 58 with respect to the upper mold ring 48 and subsequently positions the bead portion 78 over the upper mold ring 48.

Figure 6:
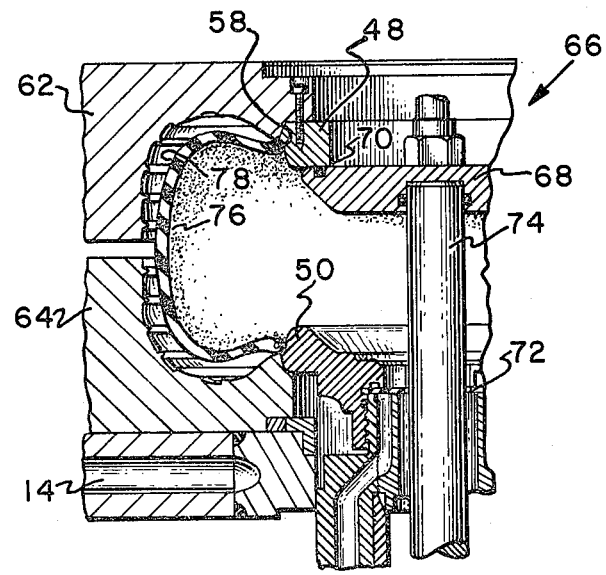

With some bias tires it has been found useful to preshape the cylindrical uncured tire to more closely approximate its final toroidal shape before placing the uncured tire in the curing press. Such preshaping in the instance of the tire and press illustrated in FIGS. 5 through 8 was found to be unnecessary outside of the press because it could be accomplished within the press as illustrated in FIG. 6. Since preshaping within the press occurs as mold portions 62 and 64 are coming together, it can be advantageous to pause the closing motion of the press to provide additional time for the tire 76 to shape out into the mold prior to the press closing and the mold portions 62 and 64 coming together. Whether or not the pause is required is a function of the speed of closing of the press as well as the magnitude of pressure of the low pressure media used to shape the tire. The speed of closing of the press is determinative of the length of time prior to the press closing and the low pressure media magnitude is determinative of the length of time needed to preshape the tire. Generally, the closer the two time periods match in length the more ideal the conditions for proper orientation of the uncured tire within the mold prior to curing.

The preshaping and pause portions of the cycle of the press can be useful in the curing of radial tires in addition to bias tires and for other elastomeric articles as well.

The low pressure media for preshaping and sealing could also have been air or other suitable fluid. On this press, air would have been available from that used to inflate the bladder when it was in place. Thus the source of low pressure media could have been the feed tube of the center mechanism for supplying air to the bladder which is normally equipped with a valve (neither illustrated) to stop the flow of air.

Figure 7:
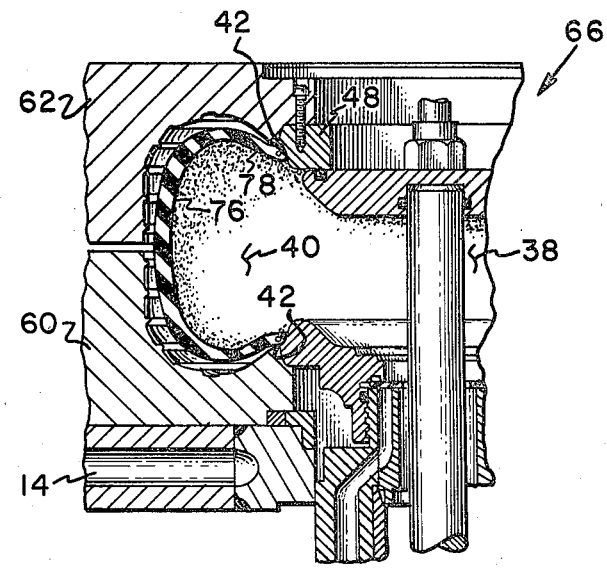
Figure 8:
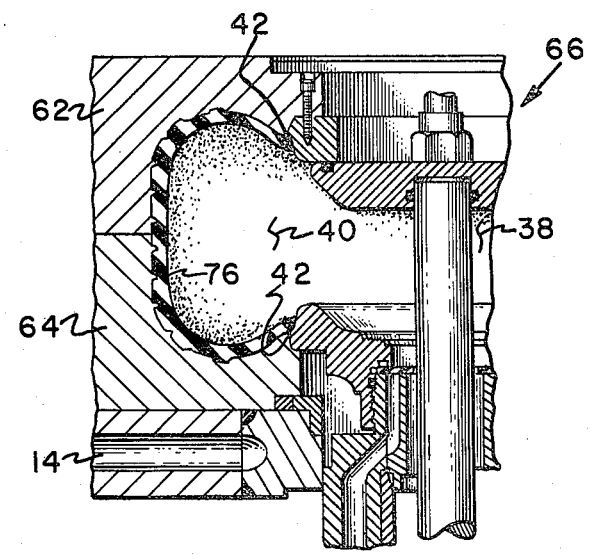

FIGS. 7 and 8 illustrate positions of the press and tire 76 just prior to closing and upon closing respectively. In FIG. 7 it can be seen that the tire bead portion 78 has been positioned to form the seal between the mold ring 48 and the remainder of the mold portion 62 at point 42. At this point the mold closes and the high pressure curing media can be introduced into the tire cavity 40 which together with the press and/or mold cavity 38 now forms a sealed chamber for high pressurization of the tire 76 against the mold portions 62 and 64 which are now in a position to properly form and shape the tire 76 to its final cure shape.

While the above embodiments have been limited in their description to the curing of tires in presses, it is to be understood that elastomeric articles other than tires such as air springs, diaphragms, couplings, etc could be cured in a similar manner.

Figure 9:
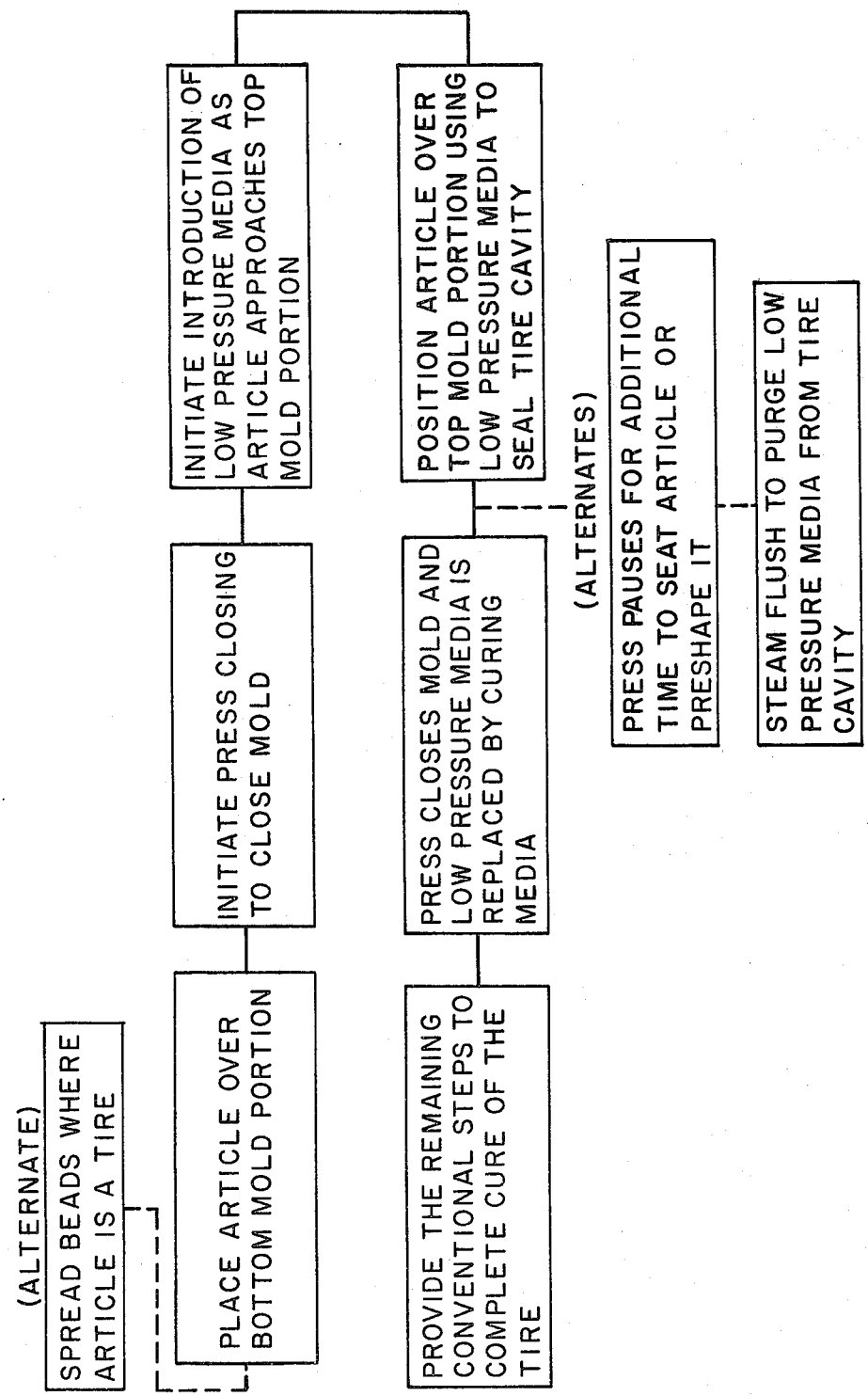
FIG. 9 is a block diagram of a method in accordance with the present invention.

Referring to FIG. 9 a block diagram of a method in accordance with the present invention is illustrated which can be used with a curing press of the standing post type or bag-in-well type for curing radial or bias tires or other elastomeric articles such as air springs, diaphragms, etc wherein the press uses neither the curing bladder or clamps for sealing the uncured tire against the mold of the press to prevent the passage of high pressure curing media between the article being cured and the mold in which it is being cured.

The method is practiced by placing a tire or similar article over the bottom mold ring which is part of a lower mold portion within a curing press and initiating closing of the press to close an upper mold portion having an upper mold ring against the lower mold portion. As a top bead seat part of an upper bead portion of the tire approaches the top mold ring, initiation of introduction of low pressure media into the tire cavity occurs. As the press continues to close the top bead seat is positioned over the top mold ring by the low pressure media thereby sealing the tire cavity. Upon closing of the press and the mold portions therein the low pressure media is replaced by curing media entering the sealed tire cavity. Curing of the tire is completed by providing the remaining conventional steps to achieve final cure.

The low pressure media can be any one of a number of fluids and preferably low pressure air or steam. An inert gas would be another example of low pressure media. The media is introduced into the press in the same manner that high pressure curing media enters the press. The flow of low pressure media through an annulus formed between the tire bead seat on which the closing portion of the press mold converges encourages centering of the tire on the mold ring part of the converging mold portion and positions the bead seat over the mold ring as the mold portion continues to close. Upon initial seating of the tire bead seats against the mold rings the low pressure media magnitude can be increased to insure that the tire bead seats have fully positioned themselves on the mold rings for a final seal before the entry of high pressure curing media. A low pressure media pressure range of 2 to 14 psi has been found practical.

It has also been found advantageous to spread the tire bead seats apart from each other where for example storage over more than a short period of time has resulted in their closing upon themselves. The spreading is accomplished by hanging the tire by a single bead seat under its own weight prior to placing the tire in the press. Further, it was also found advantageous to preshape tires particularly where the shape of the uncured tire deviated substantially from that of the final cure shape. The preshaping was accomplished within the press following sealing with the low pressure media.

It was still further found that the press could be advantageously caused to pause in its closing to permit time for proper feeding of the tire bead seat against the mold rings and/or for shaping the tire within the mold prior to closing of the mold. Finally, where air was used as the low pressure media it was found preferable to use a steam flush to purge any residual air from the tire cavity prior to introduction of high pressure curing media to assure that all the air had left the cavity thereby avoiding impregnation of the air into the inner liner of the tire prior to its being cured.

In accordance with the provisions of the patent statutes, the principal and mode of operation of the curing apparatus have been explained and what is considered to represent its best embodiment has been illustrated and described. It should however be understood that the invention may be practiced otherwise than as specifically illustrated and described without departing from its spirit or scope.

I claim:

1. A method of molding and curing a cylindrically to toroidally shaped elastomeric article in a mold having upper and lower mold portions without the use of a curing bladder or clamping means to seal the article against the mold comprising the steps of: placing the article over the lower mold portion, initiating closing of the mold, initiating the flow of low pressure media into the article cavity, providing relative movement of the article toward contact with the upper mold portion as the mold continues to close, positioning the article over the upper mold portion using the lower pressure media for initially locating the article to enable the article to seat on the upper mold portion, sealing the article against the lower and upper mold portions to form a pressure chamber of the article cavity by continuing the flow of low pressure media after contact of the article with the mold portions to further seat the article on the mold portions, closing the mold, providing curing media to the article cavity in place of the low pressure media suitable to cure the article and providing the remaining conventional steps to complete the cure of the article.

2. The method of claim 1 including shaping the article to more nearly conform to the mold using the low pressure media.

3. The method of claim 1 including centering the article to more nearly conform to the mold using the low pressure media.

4. A method of molding and curing a tire having a pair of bead seats thereon in a mold having at least two portions and one of a pair of rings on each portion without the use of a curing bladder comprising the steps of: placing the tire over one of the pair of mold rings to engage one of the pair of bead seats, initiating closing of the mold, initiating the flow of low pressure media into a cavity formed by the tire and the mold, shaping the tire to more closely conform to the shape of the mold using the low pressure media, providing relative movement of the other tire bead seat into contact with the other mold ring as the mold continues to close, sealing with the low pressure media the tire bead seats against the mold rings without the use of clamping means to seal the tire and mold cavities fluid tight, closing the mold, providing curing media to the fuid tight cavities suitable for curing the tire and providing the remaining conventional steps to complete the cure of the tire.

5. The methods of claims 1 or 4 wherein the step of providing movement includes centering the article being molded relative to the mold portion towards which it is moving into contact.

6. The method of claims 2 or 4 including causing a pause in the closing of the mold to provide additional time for shaping the article being molded.

7. The method of claims 2 or 4 including causing a pause in the closing of the mold to provide additional time for sealing of the article being molded against the mold portions.

8. The method of claims 1 or 4 including steam flushing the low pressure media from the cavity of the article being molded before initiating introduction of curing media thereto.

9. An apparatus for molding and curing a cylindrically to toroidally shaped elastomeric article without the use of a curing bladder or clamping means to seal the article against the mold comprising: a mold having upper and lower mold portions, means for placing the article over the lower mold portion, means for initiating closing of the mold, means for initiating the flow of low pressure media into the article cavity, means for providing relative movement of the article toward contact with the upper mold portion as the mold continues to close, low pressure media means for positioning the article over the upper mold portion for initially locating the article to seat on the upper mold portion and for sealing the article against the lower and upper mold portions to form a pressure chamber of the article cavity by continuing the flow of low pressure media after contact of the article with the mold portions to further seat the article on the mold portions, means for closing the mold, and means for providing curing media to the article cavity in place of the low pressure media suitable to cure the article.

* * * * *